United States Patent [19]

Mikami et al.

[11] 4,385,158

[45] May 24, 1983

[54] ORGANOPOLYSILOXANE COMPOSITION

[75] Inventors: Ryuzo Mikami; Yuji Hamada, both of Ichihara, Japan

[73] Assignee: Toray Silicone Company, Ltd., Tokyo, Japan

[21] Appl. No.: 285,887

[22] Filed: Jul. 22, 1981

[30] Foreign Application Priority Data

Aug. 8, 1980 [JP] Japan ............................... 55-109016

[51] Int. Cl.³ .......................... C09D 3/82; C08L 83/06
[52] U.S. Cl. .................................... 525/476; 524/449; 524/588; 525/477; 525/479
[58] Field of Search .............. 260/18 S; 525/477, 476, 525/479

[56] References Cited

U.S. PATENT DOCUMENTS

| | | | |
|---|---|---|---|
| 4,082,719 | 4/1978 | Liles et al. | 525/476 |
| 4,122,127 | 10/1978 | Mikami et al. | 528/18 |
| 4,267,297 | 5/1981 | Hanada et al. | 528/18 |
| 4,283,513 | 8/1981 | Mikami | 525/476 |
| 4,287,326 | 9/1981 | Mikami | 525/476 |

FOREIGN PATENT DOCUMENTS

| | | |
|---|---|---|
| 38-14497 | 8/1963 | Japan . |
| 47-3709 | 2/1972 | Japan . |
| 51-20047 | 6/1976 | Japan . |
| 52-48902 | 12/1977 | Japan . |
| 53-9640 | 4/1978 | Japan . |
| 53-13503 | 5/1978 | Japan . |

*Primary Examiner*—Ronald W. Griffin
*Attorney, Agent, or Firm*—Robert L. McKellar

[57] ABSTRACT

What is disclosed herein is a room temperature curable, one component epoxy resin modified silicone resin which has excellent heat resistance, adhesiveness to substrates, and is hard. The improvements in properaties are obtained by the use of epoxy fatty acid esters in the coating formulation.

5 Claims, No Drawings

ORGANOPOLYSILOXANE COMPOSITION

BACKGROUND OF THE INVENTION

It is known in the prior art to modify silicone resins with epoxy resins in order to obtain heat resistant paints such as shown in the Japanese patents Sho 38-14497, Sho 47-3709, Sho 51-20047, Sho 52-48902 and Sho 53-9640. However, when these known epoxy resin modified silicone resins are used in heat resistant paints, and even though these epoxy resin modified silicone resins are filled with heat resistant fillers, the best heat resistance that can be obtained with such materials is about 500° C., and therefore these materials cannot be used in gas-fired ovens. These materials are not hard and they have only average adhesion when cured at room temperature and therefore, they peel off substrates and are easily scratched when they come in contact with other surfaces.

The present invention is an improvement over the prior art in that the disadvantages set forth above are overcome by the composition of the present invention. The compositions of the present invention, when cured, give excellent heat resistance to temperatures of 400°–600° C. but moreover, the inventive materials give hard films which stick tenaciously to various substrates even when cured at room temperature.

THE INVENTION

What is disclosed herein as an improvement in the art of epoxy modified-silicone resins is an organopolysiloxane composition consisting of (A) a curable organopolysiloxane resin composition consisting of (1) 100 parts by weight of an organopolysiloxane resin having the unit formula $$R_aSiX_bO_{(4-a-b)/2}$$

wherein R is a substituted or unsubstituted monovalent hydrocarbon radical of 1–18 carbon atoms; X is a hydroxy radical or an alkoxy radical wherein the number of carbon atoms in the alkoxy radical is 1 or 2, a has an average value of 0.9–1.8 and b has an average value of greater than 0 to 1; (2) 1–150 parts by weight, based on 100 parts by weight of (1), of an alkoxysilane having the general formula $R'_mSi(OR'')_{4-m}$ wherein R' is a monovalent hydrocarbon radical having 1–6 carbon atoms, R'' is an alkyl radical having 1–3 carbon atoms and the value of m is 0, 1 or 2; (3) 0.1 to 30 parts by weight, based on 100 parts by weight of (1), of an aminoalkylalkoxysilane having the general formula $$(R^{v}O)_{3-n}SiR^{iv}NHR'''\overset{(R^{v})_n}{\mid}$$

wherein R''' is hydrogen or the methyl radical, $R^{iv}$ is a divalent organic radical selected from the group consisting of alkylene groups of 1–3 carbon atoms, the phenylene group, —CH$_2$CH$_2$C$_6$H$_4$—, —(CH$_2$CH$_2$OCH$_2$CH$_2$), —(NHCH$_2$CH$_2$CH$_2$)$_y$ and —(NHCH$_2$CH$_2$)$_y$ wherein y has a value of 1–3; $R^v$ is a monovalent hydrocarbon radical; $R^{vi}$ is an alkyl radical of 1–3 carbon atoms and n has a value of 0 or 1; and (B) an epoxy resin fatty acid ester.

What the inventors mean by "curable" is that the compositions of this invention are capable of being converted to the hardened state, either with or without catalyst or with or without the application of heat.

The component (A)(1) of this invention is an organopolysiloxane resin which is well-known in the art. Such resins have a degree of organic substitution on the silicon atom of 1.8 or less. Such resins have residual hydroxy or alkoxy groups also attached to the silicon atom. For purposes of this invention the component (A)(1) has the unit formula $$R_aSiX_bO_{(4-a-b)/2}$$

R in this invention is a substituted or unsubstituted monovalent hydrocarbon radical of 1–18 carbon atoms. Such groups can be alkyl groups such as, for example, methyl, ethyl, propyl, butyl and octadecyl; alkenyl groups such as vinyl and allyl; aryl groups such as phenyl groups and groups such as haloalkyl and cyano groups. These groups are directly bonded to silicon atoms and for purposes of this invention, there are on the average of 0.9–1.8 such groups per silicon atom. Therefore, the average value of a is 0.9 to 1.8. In order to increase the heat resistance of the cured film, it is desirable that phenyl groups be present in the resin.

X for purposes of this invention is a hydroxyl radical or an alkoxy radical wherein the number of carbon atoms in the alkoxy radical is either 1 or 2. There is either some hydroxyl or some alkoxy groups on the silicon atoms of the resin and therefore, the average value of b is always greater than zero but for purposes of this invention, the average value of b does not exceed 1. The presence of such groups allows the resin to participate in the curing of the organopolysiloxane composition. These materials are readily produced by the known cohydrolysis of chlorosilanes or alkoxysilanes which have the mixtures of such silanes to give a degree of substitution of organic groups of 0.9–1.8. The hydrolysis is generally carried out using excess water and solvent although, such hydrolysis reactions can be carried out using little or no solvent. After the hydrolysis has taken place and the water and by-produced acids or alcohols have been removed, the resin can be heat treated to increase its molecular weight, either with or without the use of catalyst. The resins designated herein as (A)(1) can be used in the form of the hydrolyzate or they can be used as the heat treated resin. Also, mixtures of such prepared resins can be used herein. Thus, it is contemplated within the scope of this invention to use partial hydrolyzates of the silanes in order to obtain resins having some hydroxyl groups and some alkoxy groups on silicon or it is contemplated that alkoxy substituted resins can be mixed with hydroxyl substituted resins to give a product containing both alkoxy and hydroxy groups as substituents on the resin. Generally, this component is used at 100 parts by weight.

Component (A)(2) which is used in this invention is an alkoxysilane which performs as a crosslinker during the cure of the organopolysiloxane composition. This silane has the general formula $R'_mSi(OR'')_{4-m}$. For purposes of this invention, R' is a monovalent hydrocarbon radical having 1–6 carbon atoms. Thus, R' can be the vinyl group, methyl group, ethyl group, propyl group or the phenyl group, among others. m for purposes of this invention has a value of 0, 1 or 2. R'' is an alkyl radical of 1–3 carbon atoms. Thus, some of the silanes contemplated within the scope of this invention are methyltrimethoxysilane, methyltriethoxysilane, ethyltrimethoxysilane, propyltrimethoxysilane, dimethyldimethoxysilane, diethyldimethoxysilane, diethyldiethoxysilane, dipropyldimethoxysilane, methylethyldimethoxysilane, ethylpropyldimethoxysilane, propylmethyldimethoxysilane, vinyltrimethoxysilane, vinylmethyldimethoxysilane, phenyltrimethoxysilane, phenylmethyldimethoxysilane, methylsilicate, ethylsilicate and propylsilicate.

It is also contemplated within the scope of this invention to use partially hydrolyzed silanes. "Partially hydrolyzed" silanes are those in which the hydrolysis is carried out with less than the stoichiometric amount of water required to hydrolyze all of the alkoxy groups on the silane. These materials are generally low molecular weight oligomers. This component is used in this invention at 1–150 parts by weight based on the weight of component (A)(1).

The third component of this invention, (A)(3), is an aminofunctional alkoxysilane. Even though this component will serve a crosslinking function in the inventive composition, its main function herein is as an adhesion promoter for the organopolysiloxane composition. The aminofunctional alkoxysilane has the general formula $(R^{vi}O)_{3-n}Si(R^v)_n R^{iv}NHR'''$. $R'''$ is a hydrogen atom or a methyl radical. $R^{iv}$ is a divalent organic radical which can be selected from the group consisting of the alkylene radical having 1–3 carbon atoms, the phenylene group, $-CH_2CH_2C_6H_4-$, $-(CH_2CH_2OCH_2CH_2)_y$, $-(NHCH_2CH_2CH_2)_y$ and $-(NHCH_2CH_2)_y$ wherein y has a value of 1–3. $R^v$ is a monovalent hydrocarbon radical, for example, methyl, ethyl, propyl, vinyl and phenyl. $R^{vi}$ is an alkyl radical of 1–3 carbon atoms and therefore is represented by methyl, ethyl, propyl and isopropyl radicals. The value of n for purposes of this invention is 0 or 1. Therefore, the following are examples of the silanes contemplated within the scope of this invention as component (A)(3):
gamma-aminopropyltrimethoxysilane, gamma-aminopropyltriethoxysilane, gamma-(aminoethyl)-aminopropyltrimethoxysilane, methylaminopropyldimethoxysilane, methyl-gamma-(aminoethyl)-aminopropyldimethoxysilane, gamma-dimethylaminopropyltrimethoxysilane, $H_2NCH_2CH_2NHCH_2CH_2NHCH_2CH_2CH_2Si(OR^{vi})_3$,
the amount of component (A)(3) useful in this invention is 0.1–30 parts by weight based on the weight of component (A)(1).

When used in this invention, the components (A)(1), (2) and (3) can be simply mixed and homogenized before mixing with component (B) or the combination can be heated to coreact the components (A)(1), (2) and (3) before they are added to component (B).

Component (B) of this invention, the epoxy resin fatty acid esters, are obtained by the reaction of epoxy resins, containing at least two epoxy groups, with fatty acids. The starting materials for these resins, as well as the resins themselves, are commercially available. For example, such resins as the products of reaction of polyglycidyl ether, in the presence of a base catalyst, with epichlorohydrin and multivalent fatty acid alcohols such as glycerin, ethylene glycol and neopentylglycol or with multivalent aromatic alcohols such as bisphenol A, bisphenol F, halogenated bisphenol A, catechol, resorcinol and methylresorcinol are available. Also included are epoxy-novalak resins obtained by the condensation of epichlorohydrin and polyglycidyl esters and novalak-type phenols; epoxylated polyolefins, epoxylated polybutadienes and epoxylated soybean oils.

The molecular weight of the resin prepared from bisphenol A and epichlorohydrin should be 300–6000. Fatty acids useful in this invention are the soybean oil fatty acids, coconut oil fatty acids, linseed oil fatty acids, tung oil fatty acids, castor oil fatty acids, dehydrogenated castor oil fatty acids and tall oil fatty acids.

The reaction to prepare the epoxy resin fatty acid esters is well-known and generally consists of the esterification of 80–55 parts by weight of the epoxy resin with 20–45 parts by weight of the above described fatty acids at a temperature between 150°–260° C. If the weight percent of the fatty acid component in the epoxy resin fatty acid ester is outside the range of 20–45 weight percent, then it is difficult to obtain a paint film with good adhesiveness and heat resistance.

It is possible to obtain the compositions of this invention simply by mixing together 10–90 parts by weight of the above-described component (A), and 90–10 parts by weight of the above-described component (B). If the component (B) makes up more than 90 parts by weight, then the paint film does not possess a superior heat resistance. After the component (A) and the component (B) have been mixed together, a heat treatment may be carried out to correct the materials.

It is within the scope of this invention to also include in the compositions such adjuvants as solvents, such as for example, toluene, xylene, acetic acid esters, ketones and the like. Catalysts may also be used to enhance the preparation of the components of this invention and also to promote the cure of the inventive composition. Fillers may also be employed herein, especially those fillers which will enhance heat resistance of the cured film. Such fillers are, for example, low melting glass frits, mica talc, silica, aluminum paste, magnesium silicate, cobalt oxide, iron oxide, aluminum oxide, titanium oxide, potassium oxides, titanium oxide, asbestos, clay, carbon black and silicon carbide.

The compositions of the present invention, besides being used as a vehicle for heat resistant-paints in gas-fired stoves, on automobile engines, on boilers, in chemical plants maintenance paints, and on furnaces, can also be employed in a wide range of applications as additives, for example in resin compounds of electrically insulating varnishes, binders and in electrophotographic applications.

Described below are some comparative examples and some examples of the compositions of the present invention. For both the comparative examples and the examples, "part" and "%" have the meanings, respectively, of "part by weight" and "percent by weight".

The tests which are used for the examples are the following.

GRID TEST (% adhesion)

A paint film is spread on a soft steel metal panel and cured. A 1 cm² area of the paint film is scratched in the following manner. 100 vertical and horizontal grooves spaced 1 mm² apart are scratched in the paint film. A piece of commercially available adhesive tape (cellotape made by the Nichiban Company, Ltd., Japan) is pressed onto the top of this scratched film and quickly pulled away and the number of grid squares which do not peel off are compared to those grid squares which do peel off. The result is reported as the percentage of grid squares which remain. 100% means that no loss of adhesion occurred.

SURFACE AREA PEELING TEST (% peeling)

After the paint film cured on a metal plate was heated to a specified temperature, it was allowed to cool naturally and return to room temperature. The exterior appearance of the paint film was examined with the naked eye at this time, and the surface of the paint film which could be seen to have peeled off was expressed as a proportion of the total painted surface. Thus 0% expresses a surface which exhibited no peeling whatsoever, while 100% means that the entire surface has peeled off.

COMPARATIVE EXAMPLE 1

A composition was prepared from an alkoxylated methylphenylsiloxane resin having an organic group substitution to silicon ratio (R/Si) of 1.7, a ratio of methyl groups to phenyl groups of 1.0, an average molecular weight of 1000 and a methoxy content of 15 weight percent, and an epoxy resin manufactured by the Shell Chemical Company of Japan (Epicoat 1001), by reacting the components in the presence of xylene and isopropyltitanate (IV) as a catalyst. Also added were cobalt black No. 3031 black dyestuff manufactured by Asahi Sangyo; mica No. 1000 manufactured by Yamada Kogyosko, glass frit XD-9AM manufactured by Nikon Ferro, a carboxylic acid anhydride NH-2200 manufactured by Hitachi Kasei and cobalt octanoate. Four resins were thus produced and are shown in Table I as samples 1-4.

These paint panels were 50×100×0.5 mm in size at a wet paint film thickness of 40-50μ. They were cured for 30 minutes at 170° C. The plates are then heated for 15 hours, respectively at 400°, 450°, 500° and 600° C. and allowed to cool. The results of the testing is shown in Table II.

When the modified silicon epoxy resin with a siloxane content of less than 30% is heated at 400° C. for 15 hours, the paint film partially peels off. A good paint film is maintained when the siloxane content is raised to 40% but the film still partially peels. Heat resistant properties of these films do not exist above 450° C.

COMPARATIVE EXAMPLE 2

An esterified epoxy resin was prepared by reacting 225 parts of Epicoat 1007 (Shell Chemical Co.) epoxy resin and 120 parts of coconut oil fatty acid at 240° C. until an acid number of 10 was reached. This material was diluted with xylene. This material was then reacted with a methylphenylsiloxane resin which contained 17 weight percent methoxy substitutents. This siloxane resin had a molecular weight of 900, an R/Si ratio of 1.7 and a methyl/phenyl ratio of 0.8. Tetraisopropyltitanate was used as the catalyst. The same fillers and colorants as used in Comparative Example 1 were used in this example.

In addition, the melamine resins used as crosslinking agents in comparatives examples 7 and 8 are also used, and four modified silicon epoxy resin paints were produced (see Table III).

These paints were painted onto soft steel plates in the same manner as in comparative Example 1 and cured likewise in the same manner. Under the same conditions as in comparative example 1, tests were carried out on the heat-resistance properties. In addition, after the soft steel plates were painted and left at room temperature for 24 hours, the pencil hardness was also measured. These results are summed up in Table IV.

In Table IV, although No. 8 shows that the heat-resistant properties were improved up to 500° C., at 600° C., the paint film peels off completely, so that at 600° C. there was no heat-resistant property at all. In addition, the pencil hardness of the paint film, after 24 hours at room temperature, was less than 6 B in each case, and when a fingernail was scratched along it, the paint film peeled off easily and completely.

EXAMPLE 1

A uniform solution of 50% solid components was produced from 100 parts of methylphenylpolysiloxane resin which had a hydroxyl content of 0.1 wt%, a methyl group/phenyl group=2.0, and an R/Si=1.40; 30 parts methyltrimethoxysilane; 10 parts gamma-aminopropyltrimethoxysilane, and 140 parts xylene. This was composition (A).

By means of the reaction between epoxy resin and coconut oil fatty acids employed in comparative example 2, silicone composition (A) is reacted at 100° C. for 5 hours in the proportions shown in Table V with a 50% xylene solution of epoxy resin fatty acid esters (A). To this, n-butanol is added as a gelation inhibitor, and, in addition, the heat-resistant filler agents are added in the same amounts and in the same manner as in comparative example 1. Soft steel plates were painted and baked as before, so that a paint film is formed. The heat-resistance test was carried out on these in the same manner as in comparative example 1. In addition, the pencil hardness was measured after the soft steel plates had been painted and allowed to set for 24 hours at room temperature. The results are summed up and shown in Table VI.

In the Comparative Examples, where the ratio of silicone compound (A) is small, the heat-resistant properties are remarkably inferior, and although the 500°-600° C. high heat-resistant properties of the silicone compound (A) alone are excellent, the adhesive properties at the comparatively low temperatures of 400°-500° C. are reduced. In comparison, the compositions of the present invention maintain excellent adhesive properties over the whole range of 400°-600° C., and an inspection of the exterior of the paint film also reveals nothing out of the ordinary. In addition, the pencil hardness of the paint film after setting for 24 hours at room temperature was HB-B, which is a good degree of hardness, and even if scratched with a fingernail, the paint film did not peel off.

EXAMPLE 2

A uniform solution of 50% solid components was produced from 100 parts of methylphenylpolysiloxane resin which had a methoxy content of 0.15 wt%, and which has an R/Si=1.50 and methyl groups/phenyl groups=1.0; 40 parts of methyltriethoxysilane; 10 parts gamma-aminopropyltrimethoxysilane, and 150 parts of xylene. The resulting composition is called composition (B).

An epoxy resin fatty acid ester (B) solution was produced by reacting 250 parts of epoxy resin (Epicoat 1007) made by the Shell Chemical Company and 140 parts of soybean oil fatty acids at 240° C. until the acid number was below 10, then diluting to 50% solids with xylene.

To a substance, which was produced by reacting the silicone composition (B), described above, with epoxy resin fatty acid esters (B) in the proportions shown in Table IV at 100° C. for 5 hours, was added the heat-resistant filler which was used in Example 1, in the same amounts and in the same manner. (See table VII). Heat-resistance testing was carried out. The results were summed up and are presented in Table VIII. The compositions which were produced by the present invention all exhibited excellent heat-resistant properties over the entire 400°–600° C. temperature range.

EXAMPLE 3

Composition number 6 of the present invention was produced by the reaction of 50 parts of the silicone compound (A) which was used in Example 1, with 50 parts of the epoxy resin fatty acid esters (B) which were used in Example 2. Composition number 7 of the present invention was used in Example 2 with 50 parts of the epoxy resin fatty acid esters (A) which were used in Example 1. Both of the substances were used as vehicles for paint. Heat-resistance tests were carried out for both of these under conditions which were otherwise the same as in Example 1, and the results showed that both of them exhibited excellent heat-resistant properties at all temperatures.

EXAMPLE 4

The Composition No. 1 of the present invention, found in Example 1, had the heat-resistant fillers (cobalt black, mica, and glass frit) removed, and, in their stead, 145 parts of No. 200 asbestos manufactured by the Toyo Aluminum were supplied. Otherwise the paint was produced under the same conditions as in No. 1 of this invention. The heat resistance tests were carried out in the same conditions as in Example 1 for this composition, and the results showed that it exhibited excellent heat-resistant properties over the temperature range of 400°–600° C.

TABLE I

Formulation of Comparative Examples

| | Comparative Example 1 | | | |
|---|---|---|---|---|
| Component (parts by weight) | Sample 1 | Sample 2 | Sample 3 | Sample 4 |
| Methylphenylpolysiloxane resin | 10 | 30 | 40 | 60 |
| Epoxy resin (Epicoat 1001) | 90 | 70 | 60 | 40 |
| Xylene | 100 | 100 | 100 | 100 |
| Cobalt black | 70 | 70 | 70 | 70 |
| Mica | 15 | 15 | 15 | 15 |
| Glass frit | 60 | 60 | 60 | 60 |
| Carboxylic acid anhydride | 30 | 23 | 20 | 13 |
| Cobalt octanoic acid | 0.28 | 0.28 | 0.28 | 0.28 |

TABLE II

Results of Physical Testing

| | Heating temp/°C. | | | |
|---|---|---|---|---|
| | 400 | 450 | 500 | 600 |
| Sample # | % adhesion/ % peeling | % adhesion/ % peeling | % adhesion/ % peeling | % adhesion/ % peeling |
| 1 | 20/10 | 0/70 | 0/90 | 0/90 |
| 2 | 100/0 | 0/10 | 10/70 | 0/30 |
| 3 | 100/0 | 5/10 | 20/80 | 0/20 |
| 4 | 100/0 | 25/10 | 20/70 | 5/20 |

TABLE III

Formulation of Comparative Examples

| | Comparative Example 2 | | | |
|---|---|---|---|---|
| Component (parts by weight) | Sample 5 | Sample 6 | Sample 7 | Sample 8 |
| Methylphenylpolysiloxane resin | 20 | 40 | 20 | 40 |
| Epoxy resin fatty acid esters | 80 | 60 | 80 | 60 |
| Xylene | 100 | 100 | 100 | 100 |
| Cobalt black | 70 | 70 | 70 | 70 |
| Mica | 15 | 15 | 15 | 15 |
| Glass frit | 60 | 60 | 60 | 60 |
| Melamine resin | 0 | 0 | 20 | 20 |

TABLE IV

Results of Physical Testing

| | | Heating temp/°C. | | | |
|---|---|---|---|---|---|
| | | 400 | 450 | 500 | 600 |
| Sample # | Pencil hardness | % adhesion/ % peeling | % adhesion/ % peeling | % adhesion/ % peeling | % adhesion/ % peeling |
| 5 | 6 B or less | 100/0 | —/100 | —/100 | —/100 |
| 6 | 6 B or less | 100/0 | 38/0 | 20/60 | —/100 |
| 7 | 6 B or less | 100/0 | —/100 | —/100 | —/100 |
| 8 | 6 B or less | 100/0 | 100/0 | 100/0 | —/100 |

TABLE V

Formulation of Inventive Resins and Comparisons to Low Siloxane and 100% Siloxane Containing Paints

| | The present invention | | Comparison example | |
|---|---|---|---|---|
| Component | Sample 1 | Sample 2 | Sample 1 | Sample 2 |
| Silicon composition (A) | 50 | 65 | 5 | 100 |
| Epoxy resin fatty acid esters (A) | 50 | 35 | 95 | — |
| Xylene | 100 | 100 | 100 | 100 |
| Cobalt black | 70 | 70 | 70 | 70 |
| Mica | 15 | 15 | 15 | 15 |
| Glass frit | 60 | 60 | 60 | 60 |
| n-butanol | 2 | 2 | 2 | — |

TABLE VI

| | | Results of Physical Testing | | | |
| | | Heating temp/°C. | | | |
| Sample # | Pencil hardness | 400 % adhesion/ % peeling | 450 % adhesion/ % peeling | 500 % adhesion/ % peeling | 600 % adhesion/ % peeling |
|---|---|---|---|---|---|
| 1 (invention) | HB-B | 100/0 | 100/0 | 100/0 | 100/0 |
| 2 (invention) | HB-B | 100/0 | 100/0 | 100/0 | 100/0 |
| 3 (comparison) | HB-B | —/100 | —/100 | —/100 | —/100 |
| 4 (comparison) | HB-B | 0/30 | 70/10 | 100/0 | 100/0 |

TABLE VII

| | Formulation of Inventive Resins | | | |
| | The present invention | | Comparison example | |
| Component (parts by weight) | Sample 9 | Sample 10 | Sample 11 | Sample 12 |
|---|---|---|---|---|
| Silicon compound (B) | 40 | 50 | 60 | 100 |
| Epoxy resin fatty acid esters (B) | 60 | 50 | 40 | — |
| Xylene | 100 | 100 | 100 | 100 |
| Cobalt black | 70 | 70 | 70 | 70 |
| Mica | 15 | 15 | 15 | 15 |
| Glass frit | 60 | 60 | 60 | 60 |
| n-butanol | 2 | 2 | 2 | — |

TABLE VIII

| | | Results of Physical Testing | | | |
| | | Heating temp/°C. | | | |
| Sample # | Pencil hardness | 400 % adhesion/ % peeling | 450 % adhesion/ % peeling | 500 % adhesion/ % peeling | 600 % adhesion/ % peeling |
|---|---|---|---|---|---|
| 9 | HB-B | 100/0 | 100/0 | 100/0 | 100/0 |
| 10 | HB-B | 100/0 | 100/0 | 100/0 | 100/0 |
| 11 | HB-B | 100/0 | 100/0 | 100/0 | 100/0 |
| 12 | B | 0/40 | 60/10 | 100/0 | 100/0 |

That which is claimed is:

1. An organopolysiloxane composition consisting of (A) a curable organopolysiloxane resin composition consisting of (1) 100 parts by weight of an organopolysiloxane resin having the unit formula $$R_a SiX_b O_{(4-a-b)/2}$$

wherein R is a substituted or unsubstituted monovalent hydrocarbon radical of 1-18 carbon atoms; X is a hydroxyl radical or an alkoxy radical wherein the number of carbon atoms in the alkoxy radical is 1 or 2, a has an average value of 0.9-1.8 and b has an average value of greater than 0 to 1;

(2) 1-150 parts by weight, based on 100 parts by weight of (1), of an alkoxysilane having the general formula $$R'_m Si(OR'')_{4-m}$$

wherein R' is a monovalent hydrocarbon radical having 1-6 carbon atoms, R'' is an alkyl radical having 1-3 carbon atoms and the value of m is 0, 1 or 2;

(3) 0.1 to 30 parts by weight, based on 100 parts by weight of (1), of an aminoalkylalkoxysilane having the general formula $$(R^{vi}O)_{3-n} \overset{(R^v)_n}{\underset{|}{Si}} R^{iv} NHR'''$$

wherein R''' is hydrogen or the methyl radical, $R^{iv}$ is a divalent organic radical selected from the group consisting of alkylene groups of 1-3 carbon atoms, the phenylene group, —$CH_2CH_2C_6H_4$—, —($CH_2CH_2OCH_2CH_2$), —($NHCH_2CH_2CH_2$)$_y$ and —($NHCH_2CH_2$)$_y$ wherein y has a value of 1-3; $R^v$ is a monovalent hydrocarbon radical; $R^{vi}$ is an alkyl radical of 1-3 carbon atoms and n has a value of 0 or 1; and (B) an epoxy resin fatty acid ester.

2. A composition as claimed in claim 1 wherein there is present 10-90 parts by weight of component (A) and 90-10 parts by weight of component (B).

3. A composition as claimed in claim 2 wherein the epoxy resin fatty acid ester is prepared from the reaction of 80-55 parts by weight of an epoxy resin having at least two epoxy groups per molecule and 20-45 parts by weight of a fatty acid.

4. A composition as claimed in claim 3 wherein the fatty acid is selected from a group consisting of soybean oil fatty acid, coconut oil fatty acid, linseed oil fatty acid, tung oil fatty acid, castor oil fatty acid, dehydrogenated castor oil fatty acid and tall oil fatty acid.

5. A composition as claimed in claim 4 wherein component (A)(1) is a phenylmethylpolysiloxane resin having a hydroxyl content of 0.1 weight %, a phenyl to methyl ratio of 2:1, total organic substitution to silicon ratio of 1.4; component (A)(2) is methyltrimethoxysilane and (A)(3) is gamma-aminopropyltrimethoxysilane.

* * * * *